United States Patent Office 2,842,597
Patented July 8, 1958

2,842,597

PRODUCTION OF PHENOLS AND KETONES

Andre Pacoud, St-Fons, and Maurice Fenoglio and Emmanuel Alvarado, Lyon, France, assignors to Societe des Usines Chimiques Rhone-Poulenc, Paris, France, a French body corporate No Drawing. Application June 5, 1957
Serial No. 663,591

Claims priority, application France July 21, 1954

4 Claims. (Cl. 260—593)

This invention relates to the simultaneous production of phenols and carbonyl compounds, e. g. ketones, by the decomposition of alkyl aromatic hydroperoxides by means of mineral acids such as sulphuric acid. This fission may be carried out in the presence of the aromatic hydrocarbon employed in the preparation of the hydroperoxide. More especially, in the case of cumene hydroperoxide, the fission may be effected using the mixture obtained by the incomplete oxidation of cumene, which mixture contains unconverted cumene in addition to the hydroperoxide. However, it is preferable to eliminate the cumene at a stage prior to decomposition of the hydroperoxide because its elimination after fission is complicated by the presence of the fission products, especially the phenol. Separation of the phenol from the cumene is difficult, and cumene contaminated with phenol is unsuitable for subsequent oxidation into hydroperoxide.

Before separation of the fission products by distillation, it is necessary to eliminate the mineral acid or acids present, not only on account of their corrosive effect on parts of the distillation apparatus but also because these acids act as condensing agents for the main and secondary products of the fission reaction. By way of illustration the preparation of cumene hydroperoxide in particular is always accompanied by the formation in appreciable quantity of the corresponding carbinol, that is, dimethylphenylcarbinol. The latter substance is dehydrated by heat, and therefore during the course of the distillation, into α-methyl-styrene which in the monomeric state can readily be reconverted into cumene or used for other purposes. However, α-methyl-styrene readily undergoes polymerisation in the presence of mineral acids to yield a product of little or no utility. Moreover, mineral acids also promote the condensation of the phenol present in the fission medium with dimethylphenylcarbinol and with α-methylstyrene, to give cumylphenol in both cases, with consequent reduction in the yield of phenol itself. The products of condensation and polymerisation can only be reconverted into useful products by further treatments, which represent a complication of the industrial process.

In order to obviate these disadvantages, it has been proposed to neutralise the fission product by washing with dilute aqueous alkali, but this treatment has two disadvantages:

(a) The organic layer remaining after washing with an alkaline solution retains a proportion of mineral salts and when distilled the mineral salts are deposited on the heating elements and necessitate periodic stoppages of the plant in order that they may be removed, and (b) The washing liquor dissolves both acetone and phenol and necessitates the use of an additional processing step to recover the said two products therefrom.

It has also been proposed to wash the fission product of cumene hydroperoxide with water thereby to remove therefrom the mineral acid employed in the fission process. Whilst the disadvantage resulting from the formation of mineral salts does not arise in this case, the separation of the organic and aqueous phases becomes progressively slower and more incomplete with progressive elimination of the acid and with increase in the hydroperoxide content of the product.

According to the present invention a process for the simultaneous production of phenolic and carbonyl substances comprises effecting the decomposition of an alkyl aromatic hydroperoxide by treatment with sulphuric acid, washing the reaction products (preferably after removal of corresponding hydrocarbon) with a 0.5 to 5% by weight aqueous solution of a substantially non-volatile carboxylic acid which has an ionisation constant of at least $1 \times 10^{-4}$ and at most $1 \times 10^{-2}$, measured at 25° C., said aqueous solution having a pH of at least 1.8 and at most 5 and constituting at most 10% by volume of the said reaction products, and thereafter separating at least the phenolic and carbonyl substances from the washed reaction mixture by distillation. Suitable acids are, for example, citric acid ($K=8.4 \times 10^{-4}$), tartaric acid ($K=9.7 \times 10^{-4}$), lactic acid ($K=1.4 \times 10^{-4}$), phenolic acids such as salicylic acid ($K=1.06 \times 10^{-3}$), and aromatic di-acids such as phthalic acid ($K=1.26 \times 10^{-3}$).

The new process avoids the introduction of mineral salts capable of fouling the heating elements of the distillation apparatus. As compared with the use of pure water the said process facilitates the separation of the organic and aqueous phases, so that a methodical treatment of the fission product may be carried out in any extraction apparatus with a very small quantity of water, and a fission product may be obtained which is substantially free from mineral acidity. In addition, by reason of the use of smaller quantities of water, less phenol and acetone is left dissolved in the aqueous phase and an aqueous layer having a very high sulphuric acid content may be obtained, all or part of which may be re-used in the fission operation. The step of recovery of the acetone and the phenol dissolved in the aqueous layer can thus be simplified or even completely omitted. Another advantage of the new process resides in the fact that, as a result of the substantial elimination of all mineral acidity, the succession of operations may be carried out in apparatus constructed of material attacked by mineral acid; e. g. stainless steel equipment may be used.

At the same time as the sulphuric acid enters the aqueous phase, carboxylic acid passes into the organic layer. The presence of the organic acid in the organic layer is not only harmless, but is also of special interest. In fact, the applicants have established that carboxylic acids, as hereinbefore defined, accelerate, in the same way as sulphuric acid, the dehydration of dimethylphenylcarbinol into α-methylstyrene, but do not promote the secondary reactions of polymerisation of the α-methylstyrene and condensation of α-methylstyrene with phenol. The presence of organic acids in the fission medium thus renders it possible to obtain dehydration of dimethylphenylcarbinol in the very first stage of the operation of separating the components of the fission medium without substantial formation of polymers or of condensation products. (See the specification of application Serial No. 520,153, filed July 5, 1953, abandoned, and application Serial No. 628,578, filed December 17, 1956, which is a continuation-in-part thereof.)

This feature is of great interest because of the known fact that the presence of dimethylphenylcarbinol in the various phases of the separation is troublesome; it distils over in more or less substantial quantities with phenol, dehydrating in each distillation phase throughout the process of separation to give α-methylstyrene which contaminates the phenol and necessitates further purification thereof.

In the foregoing, reference has been made more particularly to the washing of the fission product of cumene hydroperoxide, yielding phenol and acetone, but it is to be understood that the present invention is not limited thereto; that the process may also be applied to the fission products of other alkyl aromatic hydroperoxides having one or more hydroperoxide groups attached to primary, secondary or tertiary carbon atoms in the alkyl side chains, e. g. p-cymene, di-isopropyl benzene and ethyl benzene. Preferably the process of the invention is applied to the fission of alkyl aromatic hydrocarbons in which at least one alkyl substituent containing more than two carbon atoms has one hydrogen atom attached to the carbon atom which is directly attached to the aromatic nucleus.

The following example will serve to illustrate the invention but is not to be regarded as limiting it in any way:

Example

Cumene hydroperoxide having a concentration of 89% is split by means of sulphuric acid. The fission product, which contains 2.5% of dimethylphenylcarbinol is then washed with a 2% aqueous citric acid solution. Substantially all the sulphuric acid can be eliminated by means of a methodical washing with a volume of this solution representing 10% of the volume of the fission product. The phases can be very readily separated. The product thus wished is distilled to remove the acetone therefrom, the distillation being ended at a still temperature of 110-115° C. It is found that less than 20% of the dimethylphenylcarbinol has been converted into polymethylstyrene and no formation of cumylphenol is observed. If, on the other hand, the washing is carried out with water not acidulated with an organic acid, the separation of the phases becomes increasingly difficult in proportion as the sulphuric acid is removed. When a quantity of water representing 10% of the volume of the fission product has been used as in the above experiment, the medium still contains 50 parts per million of sulphuric acid. Distillation is carried out as before and it is found that about 60% of the dimethylphenylcarbinol has been converted into monomeric α-methylstyrene, 39% of polymer and 1% of cumylphenol.

This application is a continuation-in-part of application Serial No. 522,846, filed July 18, 1955, now abandoned.

We claim:

1. A process for the simultaneous production of phenolic and carbonyl substances which comprises effecting the decomposition of an alkyl aromatic hydroperoxide by treatment with sulphuric acid, washing the reaction products with a 0.5 to 5% by weight aqueous solution of a substantially non-volatile carboxylic acid which has an ionisation constant of at least $1 \times 10^{-4}$ and at most $1 \times 10^{-2}$, measured at 25° C., said aqueous solution having a pH of at least 1.8 and at most 5 and constituting at most 10% by volume of the said reaction products, separating the organic phase from the aqueous phase containing the sulphuric acid and thereafter separating at least the phenolic and carbonyl substances from the organic phase by distillation.

2. A process for the simultaneous production of phenol and acetone which comprises effecting the decomposition of cumene hydroperoxide by treatment with sulphuric acid, washing the reaction products with a 0.5 to 5% by weight aqueous solution of a substantially non-volatile carboxylic acid which has an ionisation constant of at least $1 \times 10^{-4}$ and at most $1 \times 10^{-2}$, measured at 25° C., said aqueous solution having a pH of at least 1.8 and at most 5 and constituting at most 10% by volume of the said reaction products, separating the organic phase from the aqueous phase containing the sulphuric acid and thereafter separating at least the phenol and acetone from the organic phase by distillation.

3. A process for the simultaneous production of phenolic and carbonyl substances which comprises effecting the decomposition of an alkyl aromatic hydroperoxide by treatment with sulphuric acid, washing the reaction products with a 0.5 to 2% by weight aqueous solution of citric acid, the said solution constituting at most 10% by volume of said reaction products, separating the organic phase from the aqueous phase containing the sulphuric acid and thereafter separating the phenolic and carbonyl substances from the organic phase by distillation.

4. A process for the simultaneous production of phenol and acetone which comprises effecting the decomposition of cumene hydroperoxide by treatment with sulphuric acid, washing the reaction products with a 0.5 to 2% by weight aqueous solution of citric acid, the said solution constituting at most 10% by volume of said reaction products, separating the organic phase from the aqueous phase containing the sulphuric acid and thereafter separating at least the phenol and the acetone from the organic phase by distillation.

References Cited in the file of this patent

UNITED STATES PATENTS

| | | |
|---|---|---|
| 2,672,485 | Menn et al. | Mar. 16, 1954 |
| 2,720,549 | Armstrong et al. | Oct. 11, 1955 |
| 2,728,793 | Armstrong et al. | Dec. 27, 1955 |
| 2,728,795 | Armstrong et al. | Dec. 27, 1955 |
| 2,750,424 | Armstrong et al. | June 12, 1956 |

FOREIGN PATENTS

| | | |
|---|---|---|
| 477,824 | Canada | Oct. 16, 1951 |